No. 716,142. Patented Dec. 16, 1902.
H. SWINDLER.
INSECTICIDE DISTRIBUTER FOR PLANTERS.
(Application filed Aug. 26, 1902.)
(No Model.) 2 Sheets—Sheet 1.
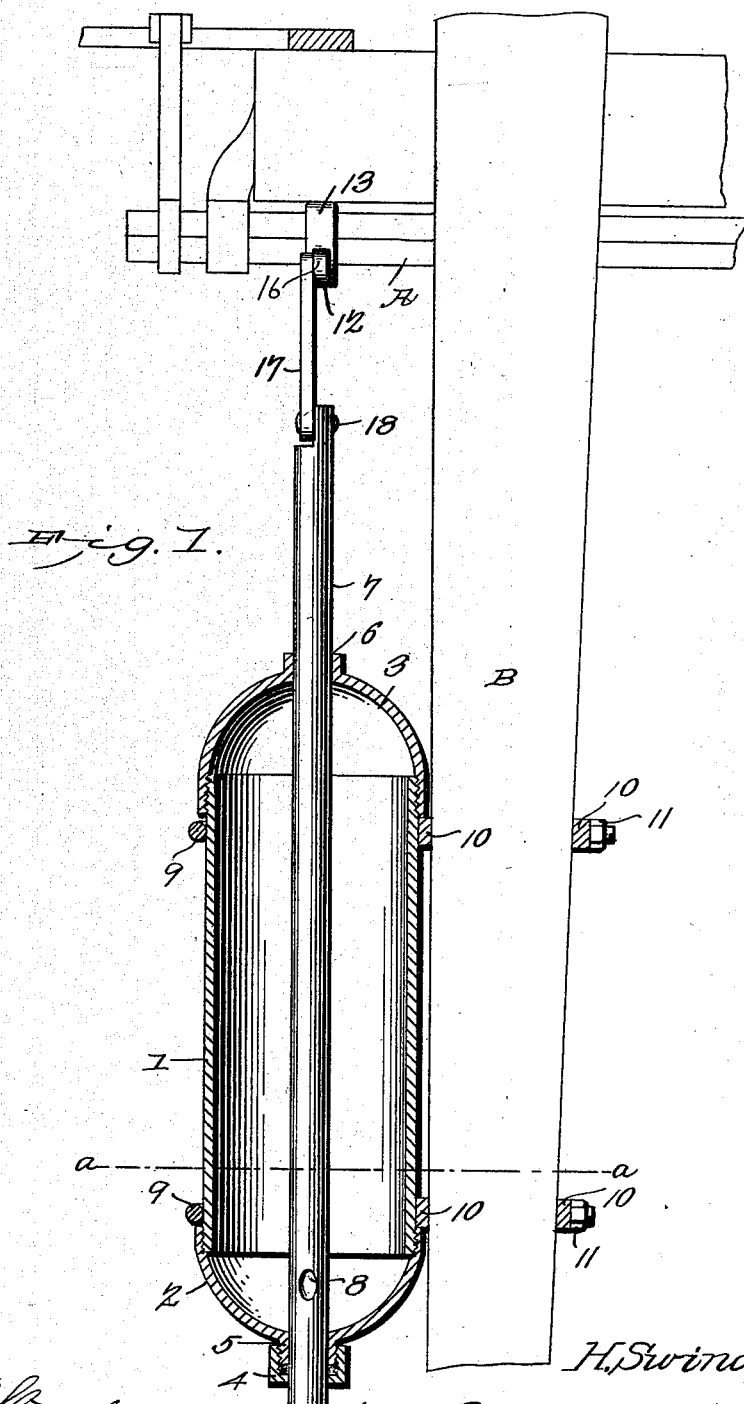

No. 716,142. Patented Dec. 16, 1902.
H. SWINDLER.
INSECTICIDE DISTRIBUTER FOR PLANTERS.
(Application filed Aug. 26, 1902.)
(No Model.) 2 Sheets—Sheet 2.
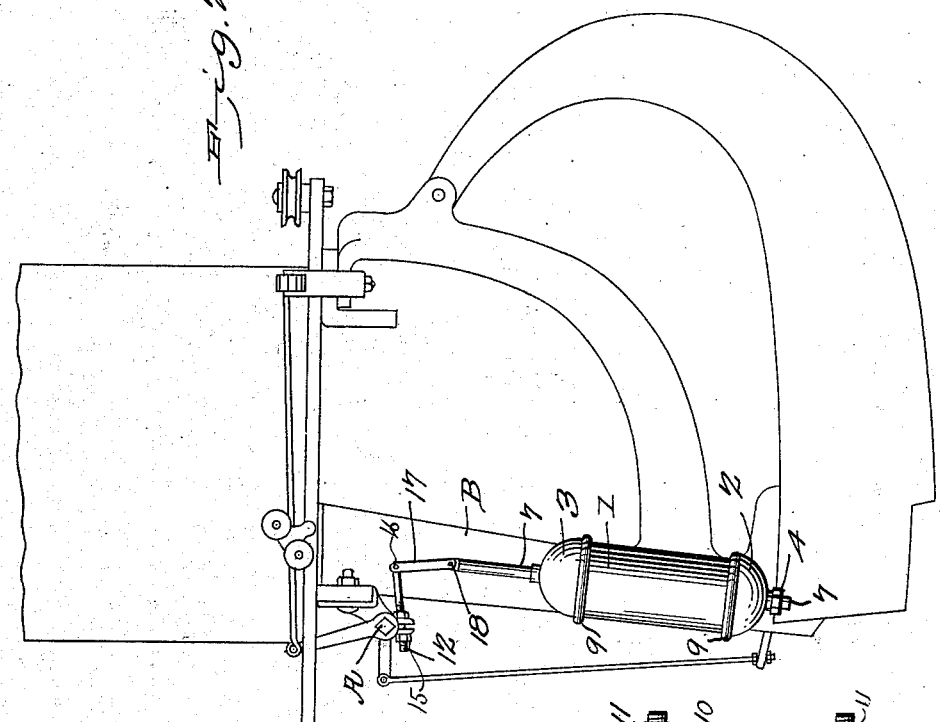
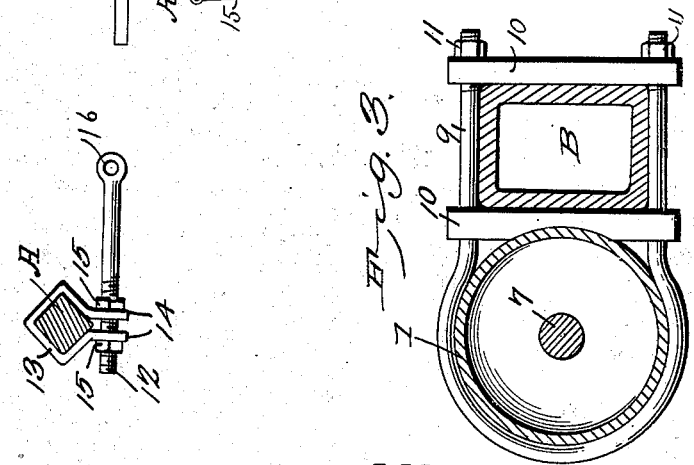

UNITED STATES PATENT OFFICE.

HENRY SWINDLER, OF MITCHELL, SOUTH DAKOTA, ASSIGNOR OF ONE-HALF TO JOHN TUCKEY, OF MITCHELL, SOUTH DAKOTA.

INSECTICIDE-DISTRIBUTER FOR PLANTERS.

SPECIFICATION forming part of Letters Patent No. 716,142, dated December 16, 1902.

Application filed August 26, 1902. Serial No. 121,132. (No model.)

*To all whom it may concern:*

Be it known that I, HENRY SWINDLER, a citizen of the United States, residing at Mitchell, in the county of Davison and State of South Dakota, have invented a new and useful Insecticide-Distributer for Planters, of which the following is a specification.

My invention is an improved apparatus adapted to be used in connection with a corn or other planter for automatically depositing liquid or powdered substances or compounds in the hills as the seeds are planted therein, to destroy or prevent the growth of fungus, and to destroy cutworms and other noxious insects and prevent them from injuring the young plants when they sprout; and my invention consists in the peculiar construction and combination of devices hereinafter fully set forth and claimed.

In the accompanying drawings, Figure 1 is a sectional view of an insecticide-distributing apparatus embodying my improvements, showing the same attached to the seed-tube of a corn-planting machine and connected to the rock-shaft of the corn-planting machine for operation thereby. Fig. 2 is a side elevation of the same. Fig. 3 is a cross-sectional view taken on a plane indicated by the line *a a* of Fig. 1. Fig. 4 is a detail elevation of the rock-arm which is attached to the rock-shaft of the planter and which operates the plunger of the distributing apparatus.

The insecticide-distributer herein shown is especially adapted for use in connection with that class of corn-planting machines in which the seed-dropping mechanism includes a rock-shaft A. However, I would have it understood that my distributing apparatus may be used in connection with other types of planters, and I do not limit myself in this particular.

In the embodiment of my invention I provide a cylindrical body 1, which has its lower and upper ends closed by semispherical or other suitably-shaped caps 2 3, which are interiorly screw-threaded and engage exterior screw-threads on the ends of the cylindrical body. Hence the caps are detachably connected to the cylindrical body and may be readily removed therefrom. The bottom cap 2 is provided with a stuffing-box 4, which is screwed to a downwardly-projecting nipple 5, with which the said cap is provided. The upper cap 3 is provided with a central opening 6. In the chamber formed by the cylindrical body 1 and the caps 2 3 is a plunger-rod 7, which extends therethrough and operates in the nipple 5 and guide-opening 6. The said plunger-rod is provided at a suitable distance from its lower end with a cup 8, which is a cavity in one side thereof and is adapted to be moved from within the chamber to a point below the stuffing-box 4 when the plunger-rod is operated. The liquid or powdered compound to be distributed by the apparatus is placed in the chamber formed by the body 1 and caps 2 3, which may be readily done by first removing the upper cap 3.

The cylindrical body 1 is detachably secured to the seed-spout B of the planter by U-shaped bolts 9 and clip-bars 10, the arms of the said bolts and the said clip-bars embracing the sides of the seed-spout, as shown in Figs. 1 and 3. The clip-bolts have nuts 11, by means of which the clip-bars are clamped firmly against opposite sides of the seed-spout, and the cylindrical body 1 is firmly clamped in position thereon. I also provide an operating-arm 12 of suitable length, which is screw-threaded, as shown in Fig. 4. On the rock-shaft A of the planter is detachably secured a yoke 13. The latter is bent from a single bar of metal to embrace the rock-shaft and to form a pair of arms 14, the said yoke being, in effect, a split ring. The arms 14 of the yoke are provided with openings through which the operating-arm 12 extends, and on the latter are clamping and adjusting nuts 15, which adapt the operating-arm to be longitudinally adjusted to increase or diminish the "throw" of its free or outer end and also serve to clamp the yoke 13 on the rock-shaft, as will be understood. The operating-arm 12 is provided at its outer end with an eye 16, to which is pivotally attached the upper end of a pitman 17, the lower end of which is pivotally connected to an eye 18 at the upper end of the plunger-rod 7. It will be understood that when the machine is in operation the motion of the rock-shaft will cause the arm 12 to oscillate, and thereby impart vertical reciprocatory motion to the plunger-rod 7. On each upstroke of the latter the cup 8 is disposed within the chamber containing the liquid or powdered insecticide or compound, so that the said cup 8 becomes filled therewith, and on each downstroke of the plunger the contents of the said cup are discharged therefrom as the same move below the stuffing-box 4 into the hill, in which seeds are simultaneously dropped by the operation of the planter. It will be understood that by removing the nuts 11 from the U-shaped bolts 9 and by loosening the nuts 15 on the arm 12 the apparatus may be readily removed from the planter.

Having thus described my invention, I claim—

1. An insecticide-distributing attachment for planters, comprising a vessel having means to detachably secure it to the seed-spout, a plunger-rod to reciprocate in the vessel and having a cup therein, an operating-arm, means to detachably secure it to a shaft of the planter, and a pitman connecting said operating-arm to the plunger-rod, substantially as described.

2. An insecticide-distributing attachment for planters comprising a vessel having means to detachably secure it to the seed-spout, a plunger-rod to reciprocate in the vessel and having a cup therein, a screw-threaded operating-arm, a clamping-yoke, adapted to be placed on a shaft of the planter and having arms with openings through which the operating-arm extends, adjusting and clamping nuts on the latter, to bear against the yoke-arms, and a pitman connecting said operating-arm to the plunger-rod, substantially as described.

3. In combination with a seed-spout of a planter, a vessel comprising a cylindrical body, and upper and lower caps screwed to the respective ends thereof, said caps having guide-openings therein, clip-bolts embracing said cylindrical body and securing the same to the seed-spout, the caps of the vessel being respectively above and below the clip-bolts to lock the vessel against endwise movement, a plunger-rod extending through the vessel and the guide-openings in the caps thereof and having a cup for the purpose set forth, an operating-arm, means to secure it to a shaft of the planter, and a pitman to connect said operating-arm to the plunger-rod, substantially as described.

In testimony that I claim the foregoing as my own I have hereto affixed my signature in the presence of two witnesses.

HENRY SWINDLER.

Witnesses:
  T. J. SPANGLER,
  HARRY MCDONALD.